United States Patent [19]

Yamamoto et al.

[11] Patent Number: 4,747,056

[45] Date of Patent: May 24, 1988

[54] AUTOMATIC TRANSMISSION CONTROL APPARATUS

[75] Inventors: Mitsuo Yamamoto, Okazaki; Norishige Yoshikawa, Chita; Nobuyoshi Nagura, Anjo, all of Japan

[73] Assignee: Aisin Seiki Kabushiki Kaisha, Japan

[21] Appl. No.: 802,399

[22] Filed: Nov. 27, 1985

[30] Foreign Application Priority Data

Nov. 29, 1984 [JP] Japan .................................. 59-252500

[51] Int. Cl.$^4$ .................. B60K 41/08; G06F 15/50
[52] U.S. Cl. .................................. 364/424.1; 74/866; 364/507
[58] Field of Search ............... 364/424.1, 507; 74/866

[56] References Cited

U.S. PATENT DOCUMENTS

| | | | |
|---|---|---|---|
| 4,126,061 | 11/1978 | Fry | 74/866 |
| 4,363,973 | 12/1982 | Kawata et al. | 364/424.1 |
| 4,393,732 | 7/1983 | Suzuki et al. | 74/866 |
| 4,476,530 | 10/1984 | Pannier | 364/424.1 |
| 4,495,457 | 1/1985 | Stahl | 364/424.1 |
| 4,499,542 | 2/1985 | Hamajima et al. | 364/424.1 |
| 4,635,508 | 1/1987 | Tatsumi | 74/866 |

FOREIGN PATENT DOCUMENTS 57-173644  1/1982  Japan .

Primary Examiner—Felix D. Gruber
Attorney, Agent, or Firm—Sughrue, Mion, Zinn, Macpeak and Seas

[57] ABSTRACT

An automatic transmission control apparatus detects an abrupt loss of signal from the speed sensor due to failure of the speed sensor and shifts the automatic transmission to a higher gear ratio. The control apparatus detects the engine rotation and the position of the shift lever so that when the engine rotation is under a predetermined level the control apparatus allows the automatic transmission to be shifted by the position of the shift lever.

1 Claim, 2 Drawing Sheets

AUTOMATIC TRANSMISSION CONTROL APPARATUS

BACKGROUND OF THE INVENTION

The present invention is directed to an apparatus and method for controlling an automatic transmission for an automobile. More specifically the present invention relates to an apparatus and method for controlling an automatic transmission in the event of an interruption or loss of the vehicle velocity signal.

Conventional automatic transmission control apparatus have a control circuit which gives a shift signal to shift the transmission in response to the vehicle velocity and the output torque of an engine or throttle opening signal. The vehicle velocity signal is supplied from a speed sensor with a reed switch which detects the revolution speed of an output shaft. The speed sensor is comprised of a magnet rotated by the output shaft for a speedometer cable which transmits rotary motion from the output shaft to a speedometer. The reed switch opens and closes under the influence of the rotating magnet to output pules at a frequency related to the velocity of the vehicle. The speed sensor is positioned adjacent to the output shaft or in the speedometer and has its wires connected to the control circuit. With such a speed sensor, the reed switch or the wires may be broken to cause an interruption or loss of the vehicle speed signal. Ordinarily this produces the same effect as a vehicle at rest and the control circuit gives a signal to shift the transmission downwardly to a low gear. This may not be a problem at low vehicle speed but it causes violet braking which jolts the driver and passengers and may lead to engine or transmission failure at higher vehicle speeds.

U.S. Pat. No. 4,499,452 discloses a safety circuit which responds to the interruption or loss of the vehicle velocity signal to control the transmission to maintain a high speed gear ratio. After the vehicle velocity signal is restored, the safety control circuit allows the transmission to change gears. However this safety control circuit maintains the same high speed gear ratio unless the vehicle velocity signal is restored. Therefore usual driving of the vehicle will be impossible once the speed sensor breaks down.

SUMMARY OF THE INVENTION

The present invention provides a new and improved apparatus and method for controlling an automatic transmission for an automobile which precludes the situations described above.

The present invention provides a new and improved apparatus and method for controlling an automatic transmission for an automobile in response to an interruption or loss of the vehicle velocity signal.

The present invention provides a new and improved method for controlling an automatic transmission of a vehicle to maintain the gear ratio in the event of an interruption or loss of the vehicle velocity signal and to allow the automatic transmission to change gear ratios when the rotational speed of the engine is under a predetermined level.

The present invention provides speed sensor for detecting the velocity of a vehicle, a throttle opening sensor for detecting the opening of the throttle and a shift position sensor for detecting the position of the shift lever. The automatic transmission is controlled by the velocity of the vehicle and the opening of the throttle in response to the shift pattern which is selected by the position of the shift lever. The present invention further provides detecting circuit means for detecting an abrupt loss of the vehicle speed signal and control circuit means for shifting the automatic transmission to a higher gear ratio.

The present invention also provides a rotational sensor for detecting the rotation of the engine detecting circuit means for detecting when the rotation of the engine falls below a predetermined level and control circuit means for shifting the automatic transmission in response to the position signal of the shift lever.

As a result of the foregoing arrangement, the automatic transmission will be controlled to shift to a higher gear ratio in the event of an interruption or loss of the vehicle velocity signal to prevent a sudden braking of the vehicle and consequent shocks to the driver and passengers. After the rotation of the engine falls below a predetermined level the automatic transmission can be controlled by changing the position of the shift lever. Thus the present invention allows the shifting of the automatic transmission even in the absence of a vehicle velocity signal to provide responsible driving conditions at all times.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
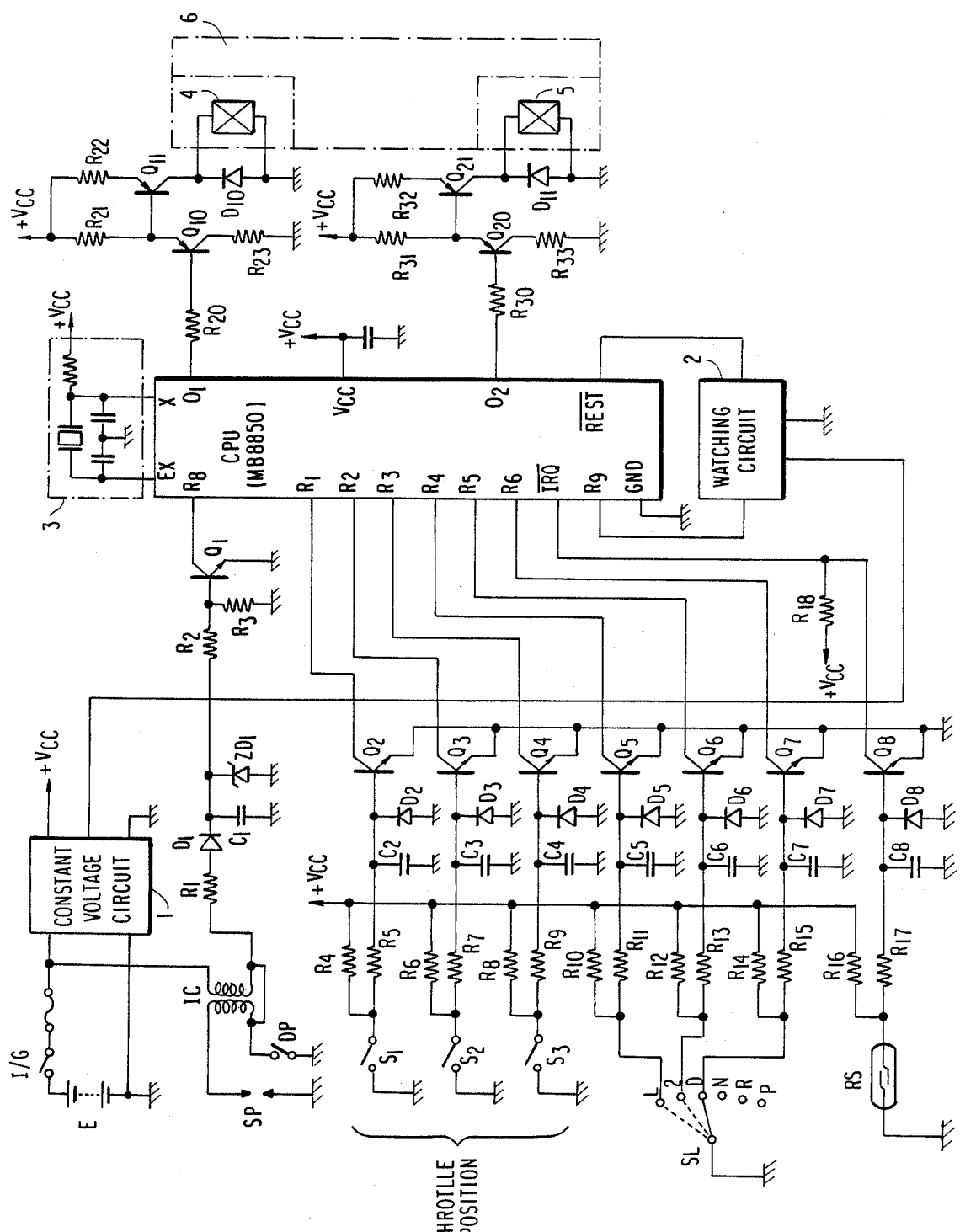
FIG. 1 is a circuit diagram of an automatic transmission control system according to the present invention.

FIG. 1 illustrates the control circuit of an automatic transmission embodied in the present invention. A constant voltage circuit 1 supplies a constant voltage +Vcc from a battery E to the control circuit. The constant voltage circuit 1 is also connected to a protection circuit 2 for preventing the micro-computer CPU from an erroneous run caused by the supply of improper voltage. The protection circuit 2 usually stops the micro-computer CPU from an erroneous run when the protection circuit determines that a predetermined program is not completed within the prescribed time in the microcomputer CPU. The constant voltage circuit 1 and the protection circuit 2 are conventionally used in computers. The micro-computer CPU may be a microprocessor or a one-chip micro-computer. As an example the present embodiment uses an MB8850 micro-computer. The micro-computer CPU operates with a signal from a pulse generating circuit 3 as a clock-pulse. Ports R1, R2, and R3, are connected to a throttle opening sensor. Ports R4, R5, and R6 are connected to a shift positioning sensor. Port R8 is connected to an engine rotation sensor and port IRQ is connected to a vehicle velocity sensor.

The engine rotation sensor detects the ignition signals of spark plug SP which are supplied from the ignition coil IC by opening and closing of breaker DP through the resistor R1 and diode D1. Capacitor C1 is used for reducing noises and the zenor diode ZD1 is for reducing voltage surges. The transistor Q1 is biased by resistors R2 and R3 and is switched to the ON/OFF state in response to the ignition signals.

The throttle opening sensor comprises switches S1, S2, and S3 which respond to the opening of the throttle valve. The switch S1 causes transistor Q2 to switch by changing the voltage at a connection of resistors R4 and R5. The switches S2 and S3 switch transistors Q3 and Q4, respectively. In this embodiment three switches output signals to the microcomputer CPU as the throttle opening signals.

The shift positioning sensor detects the position of shift leverl SL. The shift lever SL is used for choosing shift modes or running states which are memorized in the microcomputer CPU and the automatic transmission is controlled by a micro-computer CPU in accordance with the memorized modes. When the L range is selected by the shift lever SL, terminal L is grounded and transistor Q5 turns to the OFF state. Transistors Q6 and Q7 return to the OFF state when the second range and the drive range are selected by the shift lever SL, respectively.

The vehicle velocity sensor comprises a reed switch RS which opens and closes to provide output pulses under the influence of a magnet (not shown) which is rotated by a speedometer cable which transmits rotary motion from an output shaft to a speedometer. The reed switch RS turns transistor Q8 ON and OFF by changing voltages at the connection of the resistors R16 and R17. Capacitors C2–C8 are for reducing noises, the diodes D2–D8 are for absorbing voltage surges and the resistor R18 is for pull-up.

The output ports O1 and O2 of the micro-computer CPU are connected to driving circuits for solenoid valves 4 and 5. When the output O1 outputs an "H" level signal (high voltage signal) to a base terminal of the transistor Q10 through the resistor R20, the transistor Q10 turns OFF and the voltage at the base of the transistor Q11 is raised by the resistor R21 whereby the transistor Q11 turns OFF. Therefore the coil 4 of the solenoid valve is deenergized. When the output O1 outputs an "L" level signal (low voltage signal) to the base terminal of the transistor Q10 through the resistor R20, the transistor Q10 turns ON and the voltage at the base of the transistor Q11 is reduced by resistor R23 whereby the transistor Q11 turns ON to energize the coil 4. In the same manner the driving circuit which is comprised of resistors R30 and R31, R32 and R33 and transistors Q20 and Q21 deenergizes or energizes the coil 5 of the second solenoid valve in response to "H" or "L" level output signals from the output port O2. Diodes D10 and D11 are for absorbing electromotive force generated in the coils 4 and 5, respectively.

As described above the automatic transmission 6 includes a first shift solenoid valve having a coil 4 and a second shift solenoid valve having a coil 5. The automatic transmission 6 is designed with three gear ratios. When the first shift solenoid valve is energized, the automatic transmission 6 is in first gear (low speed gear ratio). When the second shift solenoid valve is energized, the automatic transmission is in second gear. When the first and second shift solenoid valves are both energized, the automatic transmission 6 is in third gear (high speed gear ratio) The shift manner may be designated in any suitable manner since the shift pattern is adaptable to many changes.

Figure 2:
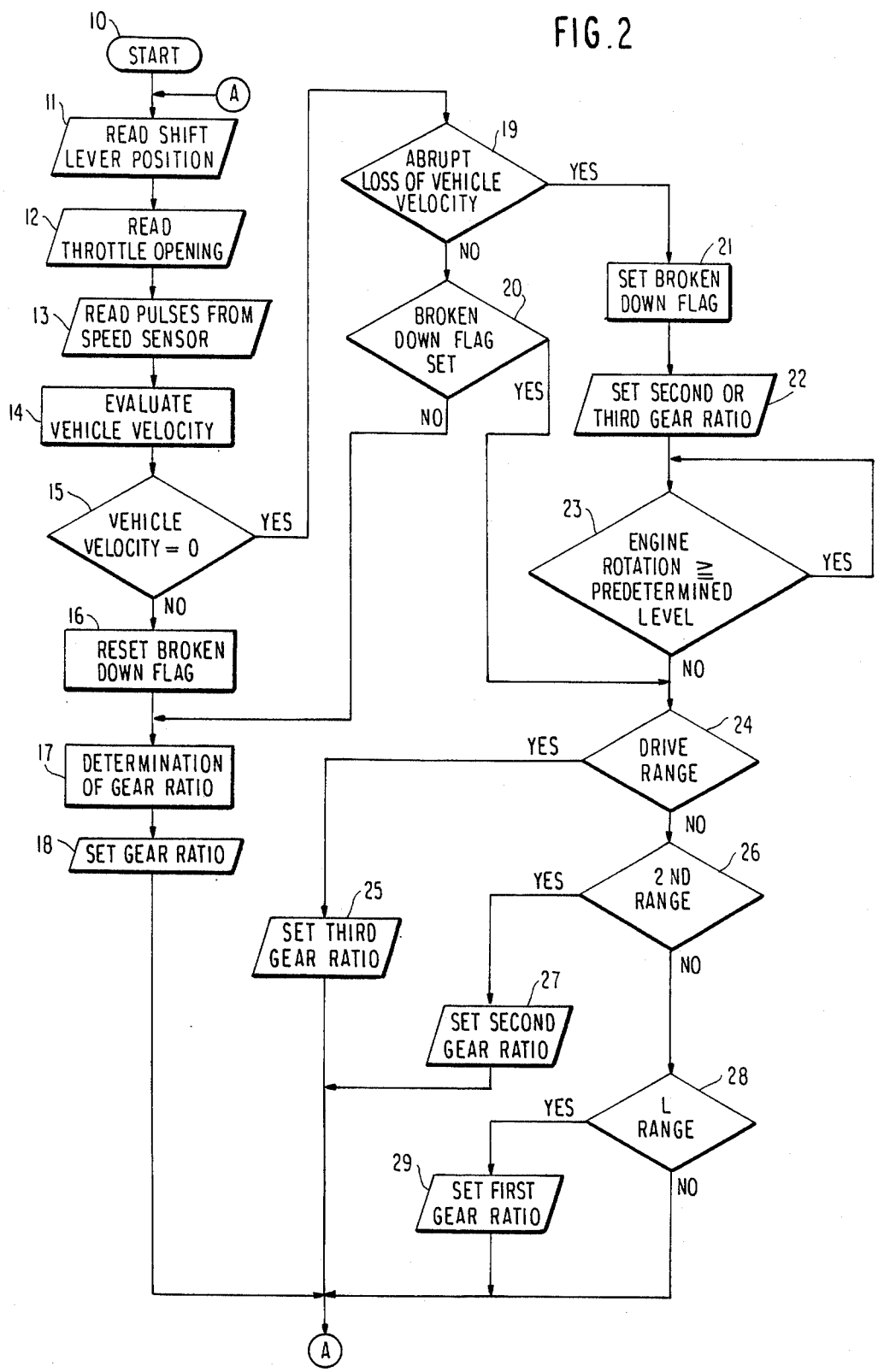
FIG. 2 is a flow diagram for the circuit shown in FIG. 1 according to the present invention.

The micro-computer CPU of the embodiment of the present invention receives the signals from an engine rotation sensor, the throttle opening sensor, the shift positioning sensor and the vehicle velocity sensor and operates in the following manner. FIG. 2 shows a flow diagram of the circuit shown in FIG. 1. In step 10 the control of the automatic transmission starts to clear memories in the micro-computer CPU and to initialize the ports of the micro-computer CPU. In step 11 the shift lever position is read to determine the shift pattern. In step 12 the throttle opening is read as the state of the switches at S1, S2, and S3. In step 13 a counter circuit of the micro-computer CPU counts pulses from the reed switch RS within a time interval. Then in step 14 the vehicle velocity is calculated according to the number of pulses counted in step 13. The control goes to step 15 where the decision is made as to whether or not the current vehicle velocity is "0". If the current vehicle velocity is not "0" then the control goes to step 16 to reset the "broken down" flag. This means that the vehicle velocity sensor is not broken down or the signals from the vehicle velocity sensor recover from an interruption or loss of the signals. The control then goes to step 17 to decide the gear responding to the vehicle velocity and the throttle opening in accordance with the shift pattern selected by the shift position. In step 18 the control outputs the signals to the driving circuit of the solenoid valves 4 and 5 to shift the gears. These steps 11–18 are conventional in automatic transmission control.

According to step 15, if the current vehicle velocity is "0" then the control goes to step 19 where the decision is made whether or not the velocity change is an abrupt one. In step 19 the current vehicle velocity is compared with the previous vehicle velocity and the decision that the velocity change is abrupt is made if the difference between the two velocities is higher than a predetermined value. If the velocity change is not abrupt then the control goes to step 20 to decide whether or not the "broken down" flag is set. If the flag is already set, it means that the loss of the vehicle velocity is continued by the failure of the vehicle velocity sensor. If the flag is not set, it means that the vehicle is at rest in a normal manner. Therefore when the flag is not set the control goes to step 17.

If the decision is made in step 19 that the velocity change is abrupt the control goes to step 21 to set the "broken down" flag. After setting the flag, the control in step 22 shifts the automatic transmission 6 to the second gear or the third gear to hold the automatic transmission. Which gear is selected in step 22 depends upon the specific type of automatic transmission involved. In step 23 the engine rotation signal is read and the decision is made whether or not the engine rotation is under a predetermined level. This predetermined level is decided from the engine rotation range corresponding to the vehicle velocity which decides to shift the gears down to the first gear ratio. If the engine rotation is over the predetermined level, the control keeps the particular gear. When the engine rotation is under the predetermined level, the control goes to steps 24–29 where the control allows the automatic transmission to shift in accordance with the position of the shift lever SL. In steps 24, 26, and 28, the position of the shift lever SL is detected and when the position of the shift lever SL is in the B range the control goes to step 25 to shift the automatic transmission to third gear. When the position of the shift lever SL is in the second range the control goes to step 27 to shift the automatic transmission to the second gear and when the position of the shift lever SL is in the third range the control goes to step 29 to shift the automatic transmission to the first gear.

Therefore in the event of interruption or loss of vehicle velocity at higher vehicle speeds, the "broken down" flag is set by the steps 15, 19, and 21 and the automatic transmission is kept at the higher gear ratio by step 22. After the engine rotation is under a predetermined level, first, second, and third gears can be selected by the position of the shift lever SL. Unless the vehicle velocity signal recovers, the "broken down" flag is set to allow the automatic transmission to be shifted by the position of the shift lever SL by step 20.

While the invention has been particularly shown and described with reference to a preferred embodiment thereof it will be understood by those in the art that various changes in form and details may be made therein without departing from the spirit and scope of the invention.

What is claimed is:

1. An automatic transmission control apparatus comprising:

speed sensor means for detecting the velocity of a vehicle;

throttle opening sensor means for detecting the throttle opening of an engine;

shift position sensor means for detecting the position of a shift lever;

rotational sensor means for detecting the rotation of the engine;

shifting means for shifting the automatic transmission in accordance with the signals from said speed sensor means, said throttle opening sensor means and said shift position sensor means; and control circuit means including micro-computer means connected to said sensor means and said shifting means comprising means for detecting an abrupt loss of the signal from said speed sensor means;

means for controlling said shifting means for shifting the automatic transmission to higher gear ratio in response to detection of said abrupt loss of signal;

means for detecting when the engine rotation is under a predetermined level; and means for permitting the shifting of the automatic transmission in response to the position signal from said shift lever position sensor under a condition of failure of the vehicle velocity signal after detecting the abrupt loss of the vehicle velocity signal and detecting when the engine rotation is under said predetermined level.

* * * * *